May 3, 1932. W. W. PETTIBONE 1,856,426
FEEDER FOR PULVERIZERS AND THE LIKE
Filed Sept. 29, 1930
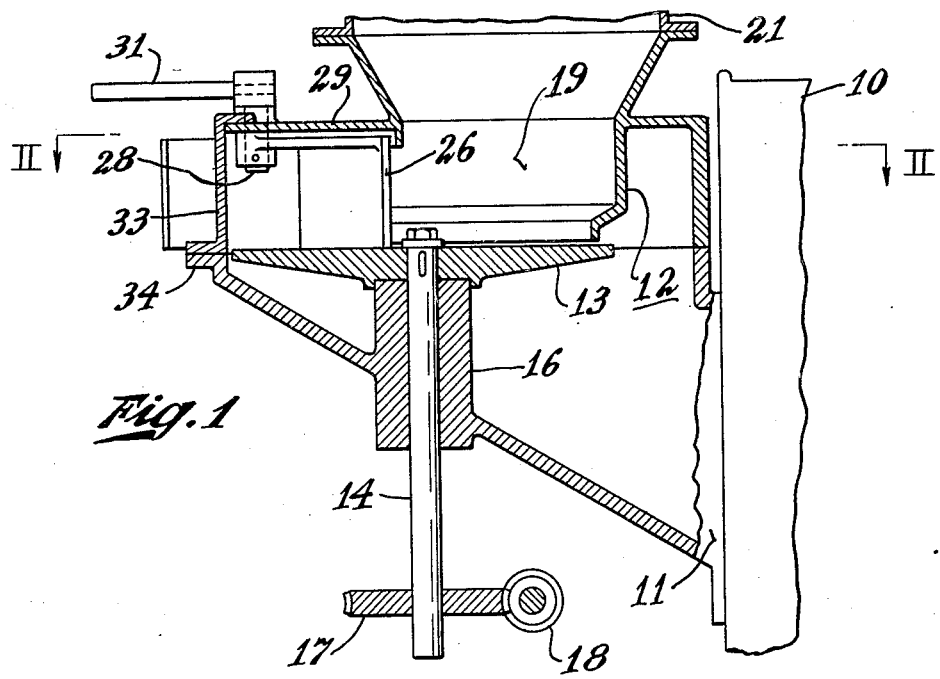
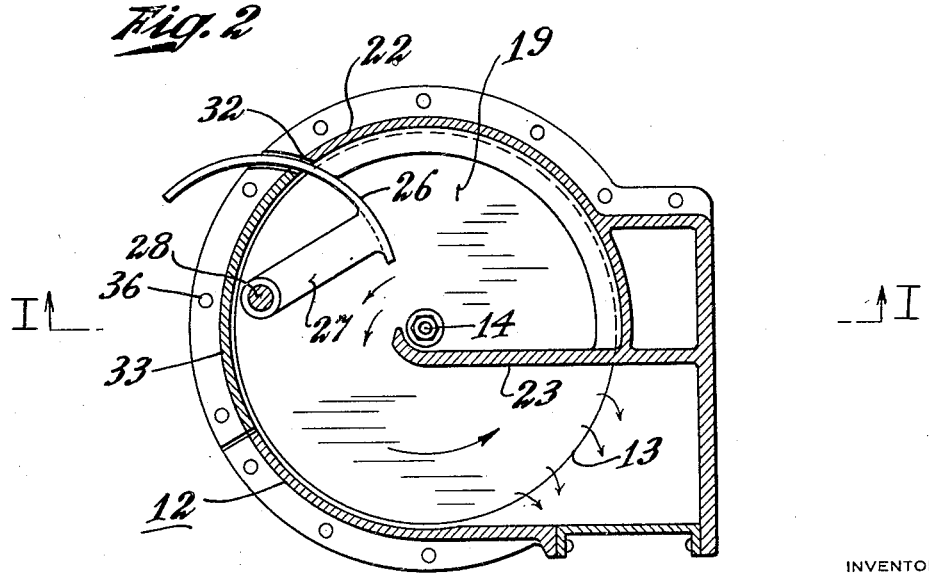
INVENTOR
Walter W. Pettibone
BY
Johnston & Jennings
ATTORNEYS
WITNESS—
Charles H. Bassett Patented May 3, 1932

1,856,426

UNITED STATES PATENT OFFICE

WALTER W. PETTIBONE, OF BIRMINGHAM, ALABAMA

FEEDER FOR PULVERIZERS AND THE LIKE

Application filed September 29, 1930. Serial No 485,187.

My invention relates to feeding mechanism for apparatus, such for example, as coal pulverizers, and has for its object the provision of apparatus of the character designated which shall be simple of design, reliable in operation and which shall include an improved means for varying the rate of feed to the pulverizer.

My invention relates particularly to that type of feeding mechanism embodying a horizontal rotary table for delivering material, and has for its particular object the provision of an improved means for varying the rate of delivery from the rotary table.

A still further object of my invention is to provide an improved material delivery means for cooperation with the rotary table of a feeding mechanism, and a simple readily accessible gate mechanism for cooperation with the delivery means to regulate the rate of flow from the rotary table.

Briefly, my invention consists in a circular, horizontal, rotary feed table with a housing for the same secured to and opening into the apparatus to be fed. A feed hopper is positioned above the housing over the table and the housing is divided by a radial wall above the table, directly under the hopper, so that material is delivered only into a segment of the housing. The dividing wall extends radially inward from the housing to approximately the center of the table and has its lower edge directly above the table. The interior of the housing is open above the table between the inner end of the radial wall and the outer wall to permit material to be carried therethrough upon rotation of the table. An arcuate gate is positioned directly in front of the opening just described and has a radial arm pivoted in the housing in front of the opening. A slot is provided in the side of the housing for the end of the arcuate gate whereby the gate may be turned about its pivot to vary the opening. A removable plate is provided in the housing adjacent the gate whereby ready access may be had to the interior for the purpose of clearing the opening of any foreign matter.

Apparatus embodying features of my invention is illustrated in the accompanying drawings forming a part of this application, in which:

Fig. 1 is a vertical sectional view of a feeder embodying my invention and taken along the lines I—I of Fig. 2; and Fig. 2 is a sectional view taken along the lines II—II of Fig. 1.

Referring to the drawings for a better understanding of my invention, I show in Fig. 1 at 10 a fragment of a pulverizer which may be of any approved type and which is representative of apparatus requiring accurate feed control. It will be obvious, however, that my improved feeding mechanism may be employed with apparatus other than pulverizers. Secured to the pulverizer 10 and opening thereinto at 11 is a cylindrical housing 12. Positioned in the lower part of the housing 12 is a rotary feed table 13 having a shaft 14 journalled in a suitable bearing 16 and driven through a worm gear 17 and worm 18 by any suitable power means, not shown.

Positioned above the table 13 is a suitable feed hopper, a fragment of which is shown at 21. A radial wall 23 extends inwardly toward the center of the table 13 and just clears the table so that material on the table is not carried under the wall 23. The radial wall 23 separates a segment 19 of the housing from the remainder, in which segment material to be pulverized is delivered from the hopper 21. The side of the segment 19 from the inner end of the wall 23 to the wall 22 of the housing is left open to permit the discharge of material from the segment upon rotation of the table 13 in the direction shown by the arrows. When the table is thus rotated the wall 23 serves as a scraper for removing material from the table to discharge it through the opening 11 into the pulverizer 10.

In order to vary the amount of material delivered through the side opening of the segment 19, I mount in front of the side opening an arcuate gate 26. The gate 26 is provided with a radial arm 27 pivoted at 28 to the cover 29 of the cylindrical casing 12. A handle 31 is secured to the upper end of the pivot pin 28 whereby the gate may be swung to any desired position. A slot 32 is provided in the outer wall of the casing 12 to permit the outer end of the arcuate gate 26 to move outwardly of the casing when being opened.

It sometimes occurs in the operation of pulverizers of this character that foreign matter such as blocks of wood, stone, etc., are introduced with the coal to the feeding mechanism and must be cleared off the rotary table 13. In order to readily accomplish this purpose, I form the casing 12 with a removable segment 33 directly in front of the gate 26 and secured to a lower flange 34 by means of bolts 36. By loosening the bolts 36, the segment 33 may be readily removed and access had to the interior of the feed mechanism.

Another important feature of my invention is the relative position of the side opening in the segmental chamber 19 and the side of the table 13 from which material is scraped off to enter the pulverizer at 11. It will be noted from a consideration of Fig. 2 of the drawings that the point of discharge of material from the table 13 is substantially diametrically opposite to the opening in the chamber 19 and the arcuate gate 26. With this arrangement, dry material being delivered from the hopper 21 to the chamber 19 will not run or flush across the table 13 to the discharge side of the table without rotation of the table.

I have found, in the operation of feeding mechanism involving a rotary table that, with thoroughly dry material, such as dry coal, there is a tendency for the coal to run across the table in a manner similar to a fluid. With my improved apparatus the relative positions of the opening and the discharge edge, together with the necessity for the material to change its direction of travel before reaching the discharge edge prevents this flushing action.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a feeder mechanism, a circular, rotary, horizontally disposed feed table, a housing for the table, a radial wall in the housing forming with the outer wall a segmental feed chamber and a segmental discharge chamber extending downwardly to the table on one side thereof, one side of said feed chamber being open for the discharge of material therethrough to the discharge chamber, and a gate pivoted to one side of the housing and adapted to swing across the opening in the segmental feed chamber to limit said opening.

2. In a feeder mechanism for pulverizers a cylindrical housing opening into the pulverizer, a horizontal rotary feed table disposed within the housing, a segmental feed chamber in the housing extending downwardly to the table on one side thereof, a radial wall in the housing forming one side of the segmental feed chamber and arranged directly above the table to serve as a scraper to remove material therefrom, one side of the chamber being open above the table for the discharge of material therefrom, and an arcuate gate pivoted on one side of the housing to swing directly in front of the opening.

3. In a feeder mechanism for a pulverizer, a cylindrical vertically extending housing opening into the pulverizer, a rotary horizontal feed table disposed in the lower part of the housing, a segmental feed chamber arranged above the table and extending downwardly thereto, one wall of the housing forming a lower side wall of the chamber, a second lower side wall extending radially inward above the table to form a scraper for removing material from the table, an arcuate gate for the open side of the chamber, a radial arm for the gate extending forwardly therefrom, and pivot means for the radial arm.

4. In a feeder mechanism for a pulverizer, a cylindrical vertically extending housing opening into the pulverizer, a rotary horizontal feed table disposed in the lower part of the housing, a segmental feed chamber in the housing above the table and extending downwardly thereto, one wall of the housing forming a lower side wall of the feed chamber, a portion of the wall in the housing extending radially inward above the table to form another wall of the feed chamber and serving as a scraper for removing material from the table, an arcuate gate for the open side of the feed chamber, a radial arm for the gate extending forwardly therefrom, pivot means for the radial arm, and means for removably securing a part of the housing wall in front of the gate.

5. In a feeder mechanism for a pulverizer, a cylindrical vertically extending housing opening into the pulverizer, a rotary horizontal feed table disposed in the lower part of the housing, a segmental feed chamber arranged above the table and extending downwardly thereto, one wall of the housing forming a lower side wall of the chamber, a second lower side wall extending radially inward above the table to form a scraper for removing material from the table, and an adjustable gate extending from the outside of the housing inwardly across the open side of the chamber.

In testimony whereof I affix my signature.

WALTER W. PETTIBONE.